(12) United States Patent
Wu et al.

(10) Patent No.: US 12,230,813 B2
(45) Date of Patent: Feb. 18, 2025

(54) TOP CAP ASSEMBLY, BATTERY, AND ELECTRICAL DEVICE

(71) Applicant: CONTEMPORARY AMPEREX TECHNOLOGY (HONG KONG) LIMITED, Hong Kong (CN)

(72) Inventors: Yukun Wu, Ningde (CN); Xiaoping Zhang, Ningde (CN); Wenzhu Xu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/608,314

(22) Filed: Mar. 18, 2024

(65) Prior Publication Data
US 2024/0222753 A1    Jul. 4, 2024

Related U.S. Application Data

(63) Continuation of application No. PCT/CN2023/072860, filed on Jan. 18, 2023.

(30) Foreign Application Priority Data

Mar. 31, 2022   (CN) .......................... 202220730192.1

(51) Int. Cl.
*H01M 50/169*   (2021.01)
*H01M 50/103*   (2021.01)
*H01M 50/15*    (2021.01)

(52) U.S. Cl.
CPC ....... *H01M 50/169* (2021.01); *H01M 50/103* (2021.01); *H01M 50/15* (2021.01)

(58) Field of Classification Search
CPC ... H01M 50/169; H01M 50/103; H01M 50/15
See application file for complete search history.

(56) References Cited

U.S. PATENT DOCUMENTS

| | | | |
|---|---|---|---|
| 2017/0047571 A1 | 2/2017 | Iwasaki et al. | |
| 2019/0363316 A1 | 11/2019 | Lee | |

FOREIGN PATENT DOCUMENTS

| | | | | |
|---|---|---|---|---|
| CN | 210576107 U | | 5/2020 | |
| CN | 212323136 U | * | 1/2021 | .......... H01M 10/425 |

(Continued)

OTHER PUBLICATIONS

English translation of CN-212323136-U (Year: 2021).*

(Continued)

*Primary Examiner* — Ula C Ruddock
*Assistant Examiner* — Sarika Gupta
(74) *Attorney, Agent, or Firm* — ANOVA LAW GROUP, PLLC (57) ABSTRACT

A top cap assembly includes a top cap plate, a mounting piece, and a protection film. The top cap plate includes an inner side and an outer side disposed opposite to each other along a thickness direction of the top cap plate, the inner side and the outer side are spaced apart from each other to form a receptacle in between, and the receptacle communicates with an outside space. The mounting piece is disposed protrusively in the receptacle and comprising a fixed end and a free end disposed opposite to each other. The fixed end is disposed on a wall of the receptacle, and the free end extends along the thickness direction of the top cap plate and is spaced apart from the wall of the receptacle to form a threading clearance. One end of the protection film is attached to the mounting piece through the threading clearance.

10 Claims, 6 Drawing Sheets

(56) References Cited

FOREIGN PATENT DOCUMENTS

| CN | 214589019 U | 11/2021 |
|---|---|---|
| CN | 217182353 U | 8/2022 |
| WO | 2020151473 A1 | 7/2020 |
| WO | 2022007481 A1 | 1/2022 |

OTHER PUBLICATIONS

The World Intellectual Property Organization (WIPO) International Search Report and Written Opinion for PCT/CN2023/072860 May 15, 2023 15 Pages (including translation).
State Intellectual Property Office of China Notice of Grant of Invention Patent Right for Application No. 202220730192.1 Jun. 29, 2022 2 pages (including translation).
The European Patent Office (EPO) The Extended European Search Report for Application No. 23777602.6 Nov. 18, 2024 40 Pages.

* cited by examiner

TOP CAP ASSEMBLY, BATTERY, AND ELECTRICAL DEVICE

CROSS-REFERENCE TO RELATED APPLICATIONS

This application is a continuation of International Application No. PCT/CN2023/072860, filed on Jan. 18, 2023, which claims priority to Chinese Patent application Ser. No. 202220730192.1, filed on Mar. 31, 2022 and entitled "TOP CAP ASSEMBLY, BATTERY, AND ELECTRICAL DEVICE", the entire contents of which are incorporated herein by reference.

TECHNICAL FIELD

This application relates to the field of battery technology, and in particular, to a top cap assembly, a battery, and an electrical device.

BACKGROUND

With continuous development of new energy technology, requirements on power batteries are increasingly higher. In a production process of a power battery, a battery cell needs to be put into a housing. In the process of putting the battery cell into the housing, in order to prevent the battery cell from being scratched by the housing during entry into the housing and to insulate the battery cell from the metallic housing, the battery cell needs to be encased in a protection film that serves to protect the battery cell.

In applying the protection film, the protection film is usually fixed onto a top cap plate of the battery by hot melting, and is wrapped around the battery cell to protect the battery cell. However, the hot-melt effect of the protection film is susceptible to factors such as temperature, pressure, and the material of the protection film, so that the protection film is prone to be drawn into filaments in a case of over-melting, peel off without melting, or incur other problems, thereby failing to serve the function of protecting the battery cell.

SUMMARY

In view of the situation above, in response to the problem that a protection film is susceptible to impact of external factors during hot melting and fails to protect a battery cell. it is needed to provide a top cap assembly, a battery, and an electrical device.

According to a first aspect, this application provides a top cap assembly, including a top cap plate, a mounting piece, and a protection film. The top cap plate includes an inner side and an outer side disposed opposite to each other along a thickness direction of the top cap plate. The inner side and the outer side are spaced apart to form a receptacle in between. The receptacle communicates with an outside space. The mounting piece is disposed protrusively in the receptacle and includes a fixed end and a free end disposed opposite to each other. The fixed end is disposed on a wall of the receptacle. The free end extends along the thickness direction of the top cap plate and is spaced apart from the wall of the receptacle to form a threading clearance. One end of the protection film is attached to the mounting piece through the threading clearance.

In the technical solution in some embodiments of this application, the mounting piece is accommodated in the receptacle. When one end of the protection film is attached to the mounting piece through the threading clearance, an end of the protection film, which is connected to the mounting piece, is also accommodated in the receptacle. Therefore, the end of the protection film, which is connected to the mounting piece, can be protected by the inner side and the outer side of the top cap plate. A junction between the protection film and the mounting piece is prevented from being damaged by an impact from an external structure, thereby ensuring structural integrity of the protection film.

In some embodiments, the receptacle includes a top wall and a bottom wall disposed opposite to each other along the thickness direction of the top cap plate. The fixed end of the mounting piece is disposed on one of the top wall or the bottom wall of the receptacle, and the free end is spaced apart from the other of the top wall or the bottom wall to form the threading clearance.

In the technical solution in some embodiments of this application, the free end of the mounting piece can be spaced apart from the other of the top wall or the bottom wall of the receptacle to form the threading clearance available for threading one end of the protection film. The protection film is attached to the fixed end, thereby implementing connection between the protection film and the top cap plate and streamlining the overall structure.

In some embodiments, the mounting piece further includes a stop portion. The stop portion is disposed protrusively on a surface of the free end, the surface being oriented back from an opening of the receptacle.

In the technical solution in some embodiments of this application, the stop portion can constrain the protection film attached to the mounting piece, and prevent the protection film from being detached from the mounting piece under an external force, thereby improving the stability of connection between the protection film and the top cap plate.

In some embodiments, the stop portion and the free end are fitted together to form a snap hook structure oriented back from an opening surface of the receptacle.

In the technical solution in some embodiments of this application, the snap hook structure facilitates the mounting of the protection film, and enables the protection film to be quickly mounted and stably connected to the mounting piece.

In some embodiments, at least two mounting pieces are disposed, and all the mounting pieces are arranged at intervals on an outer edge of the inner side along a circumferential direction.

In the technical solution in some embodiments of this application, one the one hand, the mounting piece disposed on the outer edge of the inner side facilitates the mounting of the protection film, and enables the protection film to be quickly connected to the mounting piece. On the other hand, all the mounting pieces are arranged at intervals along the circumferential direction, thereby implementing a multi-point connection between the protection film and the mounting pieces, so that the protection film is uniformly stressed when being attached to the mounting pieces.

In some embodiments, a connecting hole matching the mounting piece is created on the protection film, and the connecting hole penetrates the mounting piece to connect the protection film and the top cap plate.

In the technical solution in some embodiments of this application, the connecting holes coordinate with the mounting pieces to implement quick connection between the protection film and the mounting pieces, thereby simplifying the connection structure between the protection film and the top cap plate.

In some embodiments, one end, attached to the mounting piece, of the protection film, is folded inward to form a folded edge. The connecting hole is created on the folded edge.

In the technical solution in some embodiments of this application, on the one hand, because the mounting piece is accommodated in the receptacle, the inward folded edge enables the protection film to be attached to the mounting piece more smoothly. On the other hand, the folded edge is connected to the mounting piece by the connecting hole. Therefore, the folded edge and the mounting piece are accommodated together in the receptacle, and can be protected by the inner side and the outer side of the top cap plate, thereby ensuring the stability of connection between the folded edge and the mounting piece.

In some embodiments, the top cap plate includes a boss. The boss is supported between the inner side and the outer side along the thickness direction of the top cap plate to space out the inner side and the outer side to form the receptacle.

In the technical solution in some embodiments of this application, the boss supported between the inner side and the outer side can also serve a supporting function when connecting the inner side and the outer side, so as to space out the inner side and the outer side to form the receptacle.

According to a third aspect, an embodiment of this application provides a battery, including: a housing with an opening formed at one end, a battery cell, and the top cap assembly described above. An accommodation cavity communicating with the opening is formed inside the housing. The battery cell is accommodated in the accommodation cavity. The top cap assembly is hermetically connected to the housing at the opening.

According to a fourth aspect, this application provides an electrical device, including an electrical main body and the battery described above.

In the top cap assembly, battery, and electrical device described above, the protection film is attached to the mounting piece to implement connection between the protection film and the top cap plate, thereby effectively reducing damage to the structure of the protection film during the connection, and ensuring the structural integrity of the protection film. Further, because the receptacle is formed between the inner side and the outer side along the thickness direction of the top cap plate, the mounting piece can be accommodated inside the receptacle. When the protection film is attached to the mounting piece through the threading clearance, not only the connection between the protection film and the top cap plate is implemented, but also the junction between the protection film and the top cap plate can be accommodated in the receptacle. In this way, the inner side and the outer side of the top cap plate can exert some protective effect on the protection film, thereby improving the stability of connection between the protection film and the top cap plate, and ensuring that the protection film can effectively protect the battery cell encased inside.

The foregoing description is merely an overview of the technical solutions of this application. Some specific embodiments of this application are described below illustratively to enable a clearer understanding of the technical solutions of this application, enable implementation of the technical solutions based on the subject-matter hereof, and make the foregoing and other objectives, features, and advantages of this application more evident and comprehensible.

BRIEF DESCRIPTION OF DRAWINGS

By reading the following detailed description of embodiments, a person of ordinary skill in the art becomes clearly aware of various other advantages and benefits. The drawings are merely intended to illustrate the embodiments, but not to limit this application. In all the drawings, the same reference numeral represents the same component. In the drawings.

List of reference numerals: 1000 battery; 100 top cap assembly; 200 housing; 201 opening; 202 accommodation cavity; 300 battery cell; 10 top cap plate; 20 mounting piece; 30 protection film; 11 inner side; 12 outer side; 13 receptacle; 14 boss; 21 fixed end; 22 free end; 23 stop portion; 31 connecting hole; 32 folded edge.

DETAILED DESCRIPTION OF EMBODIMENTS

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish between different items but not intended to indicate or imply relative importance or implicitly specify the number of the indicated technical features, specific order, or order of precedence. In the description of the embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or"

relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of the embodiments of this application, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediary; or understood as internal communication between two components or interaction between two components. A person of ordinary skill in the art can understand the specific meanings of the terms in the embodiments of this application according to specific situations.

Currently, as can be seen from the market trend, the application of power batteries is increasingly extensive. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for power batteries keeps soaring with the increase of the application fields of the power batteries.

In a production process of a power battery, after a battery cell is formed, the prepared battery cell needs to be put into a housing, and a top cap plate needs to fit and cover an opening of the housing hermetically to form a complete battery structure.

The housing is of a specified dimension in depth, and the battery cell is prone to collide with or be scratched against an inner sidewall of the housing when being put into the housing, thereby resulting in damage to the battery cell. Therefore, currently, a protection film is usually disposed, and the protection film is connected to the top cap plate of the battery by hot melting. In this way, the battery cell is encased in the protection film, and then the battery cell is put into the housing together with the external protection film. In this way, the protection film can form a protection structure outside the battery cell, and avoid damage to the battery cell caused by a collision or scratch between the battery cell and the inner sidewall of the housing during entry into the housing, thereby serving a function of protecting the battery cell.

However, the applicant hereof has noticed that, due to the hot-melting connection manner, the hot-melt effect of the protection film is susceptible to factors such as temperature, pressure, and the material of the protection film, so that the protection film is prone to be drawn into filaments in a case of over-melting, peel off without melting, or incur other problems, thereby failing to serve the function of protecting the battery cell. Moreover, welding blowouts tend to occur on the top cap plate when the protection film is drawn into filaments in a case of over-melting.

In view of the above situation, in order to solve the problems that the protection film is prone to be drawn into filaments in a case of over-melting, peel off without melting, and the like, the applicant finds that the protection film may be connected to the top cap plate by being attached to the top cap plate after the top cap plate and the protection film are structurally improved. In this way, the connection between the protection film and the top cap plate is simplified and facilitated, the hotmelt-induced damage to the protection film is avoided, and the structural integrity of the protection film is ensured.

Further, the applicant considers that, if the protection film is directly mounted under the top cap plate through the mounting piece, because the junction between the protection film and the mounting piece is fragile and exposed outside, the protection film is prone to be damaged by impact from external structures at the junction during assembling of the battery. For example, during assembling, if the external structure comes into contact with the protection film, the protection film is prone to be torn at the junction, thereby resulting in damage to the structure of the protection film. If the structure of the protection film is damaged, the protection film naturally loses the function of protecting the battery cell.

Based on the above considerations, the applicant finds through further research that a receptacle may be formed in the top cap plate, and the mounting piece may be accommodated in the receptacle. The protection film may be attached to the mounting piece to implement connection between the protection film and the top cap plate. When the protection film is attached to the mounting piece, a part of the protection film, which is connected to the mounting piece, is accommodated in the receptacle. In this way, the protection film at the junction can be protected through the inner side and the outer side of the top cap plate, thereby effectively preventing the protection film from being impacted by external structures, and ensuring the protective effect of the protection film on the battery cell.

The top cap assembly disclosed in an embodiment of this application is configured to be a part of the battery, that is, hermetically connected to the opening of the housing of the battery to seal the battery cell located in the housing. The battery disclosed in an embodiment of this application may be used in, but is not limited to use in, an electrical device such as a vehicle, watercraft, or aircraft. In addition, an embodiment of this application provides an electrical device powered by a battery. The electrical device may be, but is not limited to, a mobile phone, a tablet, a laptop computer, an electric toy, an electric tool, an electric power cart, an electric vehicle, a ship, a spacecraft, or the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

Figure 1:
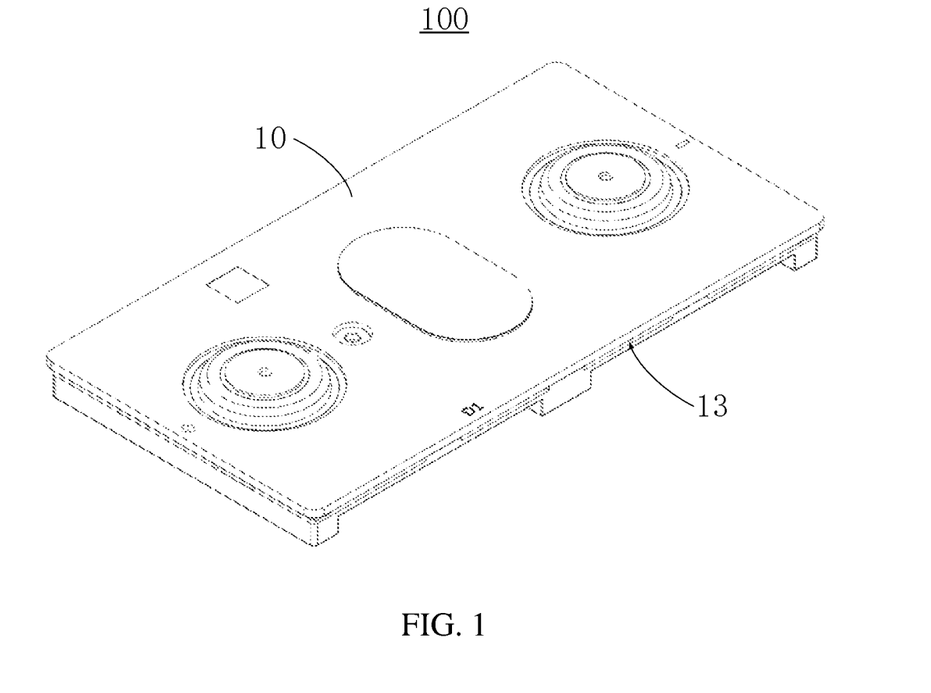
FIG. 1 is a schematic structural diagram of a top cap assembly according to an embodiment of this application.
Figure 2:
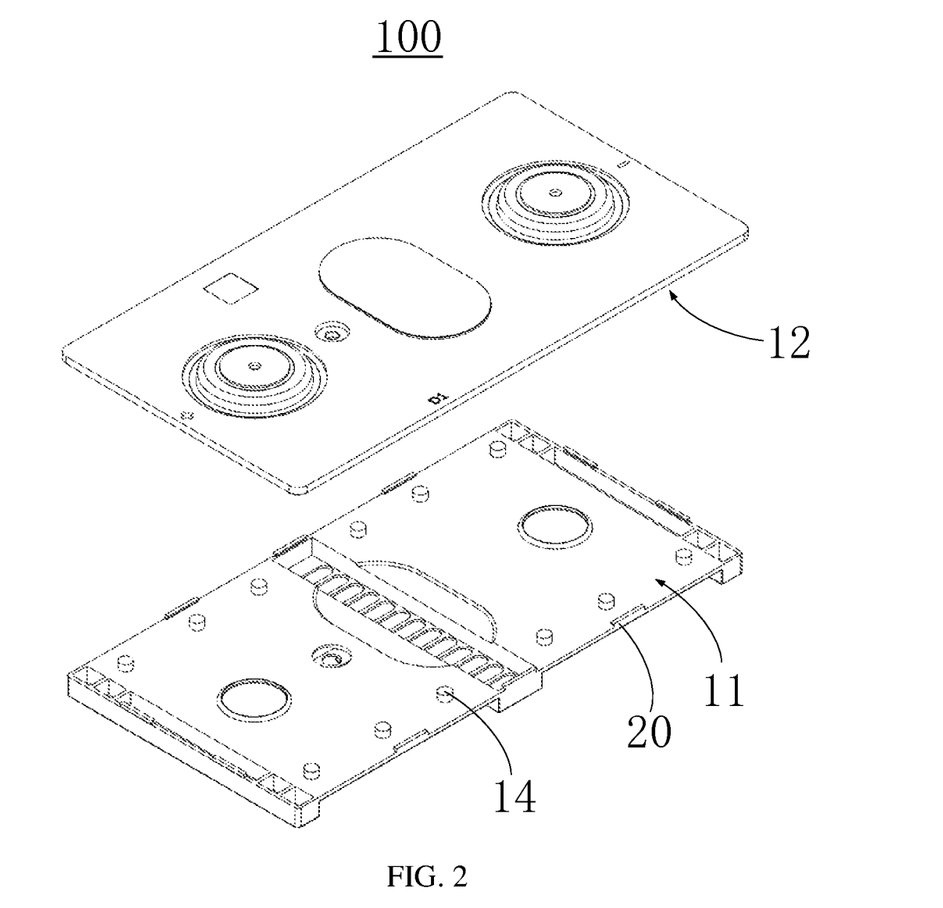
FIG. 2 is an exploded view of the top cap assembly shown in FIG. 1.
Figure 3:
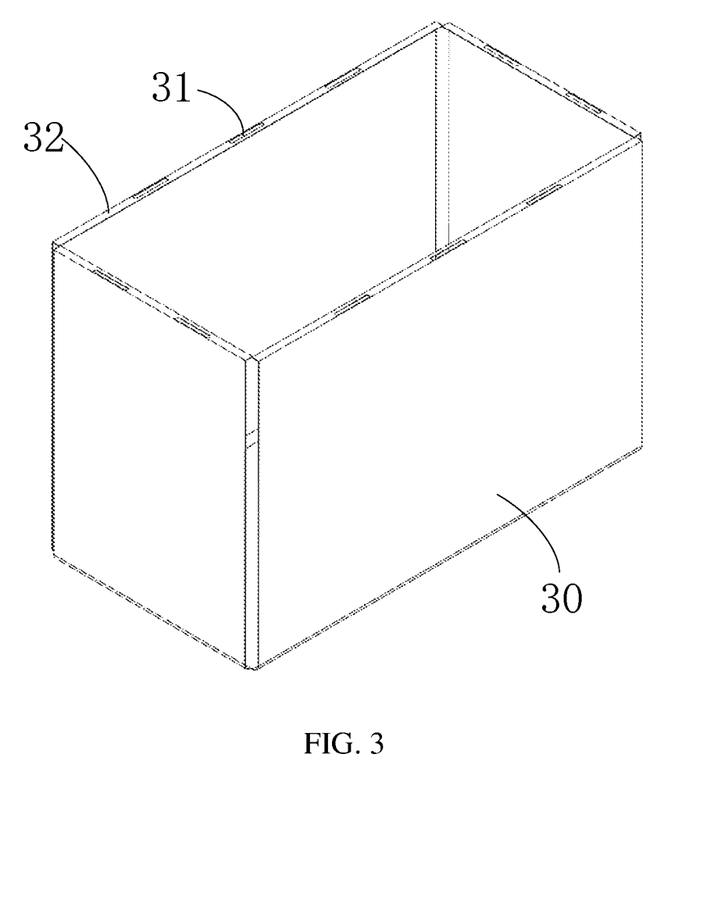
FIG. 3 is a schematic structural diagram of a protection film according to an embodiment of this application.
Figure 4:
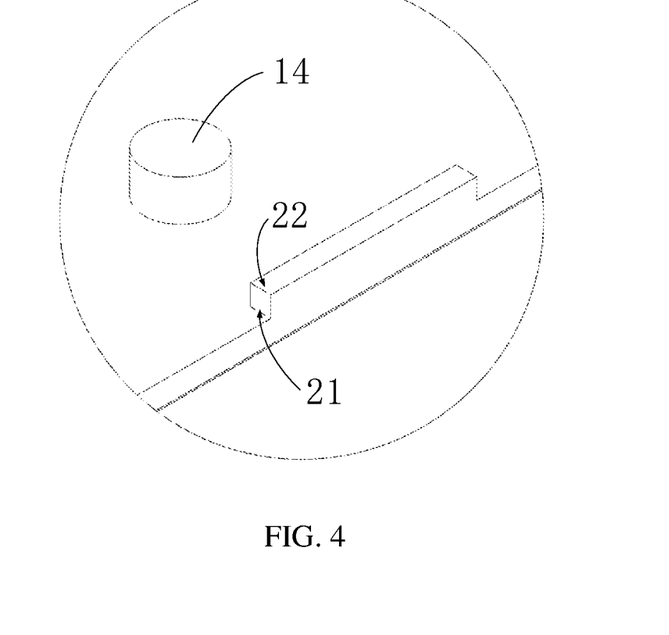
FIG. 4 is a schematic structural diagram of a mounting piece according to an embodiment of this application.

Referring to FIG. 1, FIG. 2, FIG. 3, and FIG. 4, FIG. 1 and FIG. 2 are schematic structural diagrams of a top cap assembly according to an embodiment of this application; FIG. 3 is a schematic structural diagram of a protection film according to an embodiment of this application; and FIG. 4 is a schematic structural diagram of a mounting piece according to an embodiment of this application.

An embodiment of this application provides a top cap assembly 100, including a top cap plate 10, a mounting piece 20, and a protection film 30. The top cap plate 10 includes an inner side 11 and an outer side 12 disposed opposite to each other along a thickness direction of the top cap plate. The inner side 11 and the outer side 12 are spaced apart to form a receptacle 13 in between. The receptacle communicates with an outside space. The mounting piece 20 is disposed protrusively in the receptacle 13 and includes a fixed end 21 and a free end 22 disposed opposite to each other. The fixed end 21 is disposed on a wall of the receptacle 13, and the free end 22 extends along the thickness direction of the top cap plate 10 and is spaced apart from the wall of the receptacle 13 to form a threading clearance. One end of the protection film 30 is attached to the mounting piece 20 through the threading clearance.

The receptacle 13 is a trough or cavity formed by recessing a side of the top cap plate 10 inward and capable of accommodating the mounting piece 20. Therefore, the receptacle 13 just needs to be capable of accommodating the mounting piece 20 and providing a mounting base for the mounting piece 20.

Further, because the receptacle 13 is formed between the inner side 11 and the outer side 12, that is, both the inner side 11 and the outer side 12 are configured to be walls of the receptacle 13, the fixed end 21 of the mounting piece 20 is disposed on one of the inner side 11 or the outer side 12, and the free end 22 extends toward the other of the inner side or the outer side and is spaced apart from the other of the inner side or the outer side to form a threading clearance. In this way, one end of the protection film 30 can be passed through the threading clearance and attached to the mounting piece 20, thereby implementing connection between the protection film 30 and the top cap plate 10.

Specifically, in this embodiment, the top cap plate 10 may include a first sub-plate and a second sub-plate spaced apart and stacked along the thickness direction of the top cap plate. The inner side 11 and the outer side 12 are configured to be a surface of the first sub-plate and a surface of the second sub-plate respectively, the two surfaces facing each other. As a result, the receptacle 13 is a cavity formed between the first sub-plate and the second sub-plate.

When one end of the protection film 30 is attached to the mounting piece 20 through the threading clearance, because the end, connected to the mounting piece 20, of the protection film 30, is located in the receptacle 13, the end, connected to the mounting piece 20, of the protection film 30 can be protected by the inner side 11 and outer side 12 of the top cap plate 10. Generally, the structure at the junction is relatively fragile. That is, the end at which the protection film 30 is connected to the mounting piece 20 is relatively fragile and prone to be impacted by an external structure and lead to damage to the protection film 30. Therefore, through the protection by the inner side 11 and the outer side 12, the structural stability of the protection film 30 is improved, so as to ensure a good protective effect of the protection film 30 for the battery cell 300.

In some embodiments, the receptacle 13 includes a top wall and a bottom wall disposed opposite to each other along the thickness direction of the top cap plate 10. The fixed end 21 of the mounting piece 20 is disposed on one of the top wall or the bottom wall of the receptacle, and the free end 22 is spaced apart from the other of the top wall or the bottom wall to form the threading clearance.

It is hereby noted that, when the receptacle 13 is formed between the inner side 11 and the outer side 12 of the top cap plate 10, the top wall and the bottom wall of the receptacle 13 are the inner side 11 and the outer side 12 of the top cap plate 10 respectively. The fixed end 21 of the mounting piece 20 is disposed on one of the top wall or bottom wall of the receptacle so that the free end 22 of the mounting piece 20 can extend toward and be spaced apart from the other of the top wall or bottom wall of the receptacle, so as to form a threading clearance through which one end of the protection film 30 can be threaded.

Specifically, the fixed end 21 of the mounting piece 20 may be disposed on the bottom wall of the receptacle. In this way, the free end 22 of the mounting piece 20 extends upward and is spaced apart from the top wall of the receptacle to form a threading clearance. One end of the protection film 30 is passed through the threading clearance and attached to the mounting piece 20 from top to bottom to implement connection between the protection film 30 and the top cap plate 10.

Alternatively, the fixed end 21 of the mounting piece 20 is disposed the top wall of the receptacle, and the free end 22 of the mounting piece 20 extends downward and is spaced apart from the bottom wall of the receptacle to form a threading clearance. At the same time, a groove attachable to one end of the protection film 30 may be created at the free end 22 of the mounting piece 20, so that the protection film 30 is passed through the threading clearance and mounted in the groove to implement connection between the protection film 30 and the top cap plate 10.

Figure 5:
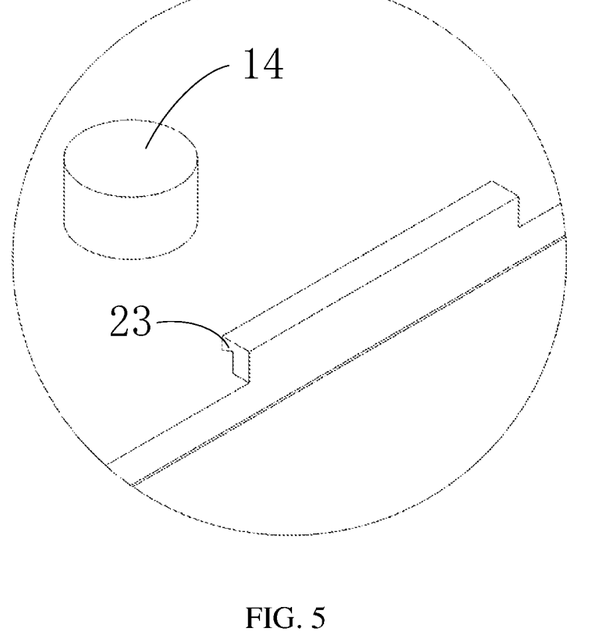
FIG. 5 is a schematic structural diagram of a mounting piece according to another embodiment of this application.

Referring to FIG. 5, FIG. 5 is a schematic structural diagram of a mounting piece according to another embodiment of this application. In some embodiments, the mounting piece 20 further includes a stop portion 23. The stop portion 23 is disposed protrusively on a surface of the free end 22, the surface being oriented back from an opening of the receptacle 13.

It is hereby noted that the opening of the receptacle 13 means an opening 201 of the receptacle 13, where the opening communicates with the outside. To be specific, when the receptacle 13 is configured to be a trough recessed on a side of the top cap plate 10, the opening of the receptacle 13 is an opening 201 disposed opposite to the side of the receptacle, the side intersecting the top wall and bottom wall of the receptacle. When the receptacle 13 is configured to be a cavity formed between a first sub-plate and a second sub-plate, the opening of the receptacle 13 is an opening 201 of the cavity on a side close to the edge of the top cap plate 10.

Therefore, the stop portion 23 is disposed protrusively on a surface of the free end 22, the surface being oriented back from an opening of the receptacle 13, which means that the stop portion 23 is disposed protrusively toward the inner side of the top cap plate 10.

When the protection film 30 is attached to the mounting piece 20, the protection film 30 assumes a tendency to be detached outward from the mounting piece 20 due to external forces such as gravity or tension. Therefore, the stop portion 23 serves a function of constraining the protection film 30, and prevents the protection film 30 from being detached from the mounting piece 20, thereby improving the stability of connection between the protection film 30 and the top cap plate 10.

In some embodiments, the stop portion 23 and the free end 22 are fitted together to form a snap hook structure oriented back from an opening surface of the receptacle 13. That is, the stop portion 23 and the free end 22 jointly form a snap hook structure that is bent toward the inner side of the top cap plate 10. The snap hook structure facilitates mounting of the protection film 30. A connecting hole 31 may be created on the protection film 30. The protection film 30 is attached to the snap hook structure through the connecting hole 31, thereby simplifying and facilitating the operation and ensuring that the protection film 30 is stably connected to the top cap plate 10.

Specifically, when the fixed end 21 of the mounting piece 20 is disposed on the bottom wall of the receptacle, the snap hook structure jointly formed by the stop portion 23 and the free end 22 extends upward, and the protection film 30 is attached to the snap hook structure in a top-down manner. When the fixed end 21 of the mounting piece 20 is disposed on the top wall of the receptacle, the snap hook structure jointly formed by the stop portion 23 and the free end 22 extends downward, and the protection film 30 is attached to the snap hook structure in a bottom-up manner.

Still referring to FIG. 2, in some embodiments, at least two mounting pieces 20 are disposed, and all the mounting pieces 20 are arranged at intervals on an outer edge of the inner side 11 along a circumferential direction.

Specifically, the inner side 11 is the bottom wall of the receptacle 13. All the mounting pieces 20 are disposed at intervals on the outer edge of the bottom wall of the receptacle along the circumferential direction. In this way, the fixed end 21 of the mounting piece 20 is disposed on the outer edge of the bottom wall of the receptacle, and the free end 22 extends toward the top wall of the receptacle and is spaced apart from the top wall of the receptacle to form a threading clearance.

Disposing the mounting piece 20 on the inner side 11 makes it more convenient to mount the protection film 30. The protection film 30 is subjected to gravity or downward tension after being attached to the mounting piece 20. Therefore, the mounting piece 20 disposed on the inner side 11 enables the protection film 30 to be mounted more stably to the mounting piece, thereby reducing the probability that the protection film 30 becomes detached from the mounting piece 20, and improving the stability of connection between the protection film 30 and the top cap plate 10.

In addition, with a view to a minimal overall volume of the top cap assembly 100, the space available for forming the threading clearance between the free end 22 and the wall of the receptacle 13 is usually small. Therefore, in order for the protection film 30 to be passed conveniently through the threading clearance and attached to the mounting piece 20, the mounting piece 20 is arranged on the outer edge of the inner side 11.

Further, all the mounting pieces 20 are arranged at intervals on the outer edges of the inner side 11 along the circumferential direction, thereby implementing a multi-point connection between the protection film 30 and the mounting pieces 20, and improving the stability of connection between the protection film 30 and the top cap plate 10.

Specifically, in this embodiment, the mounting pieces 20 are disposed in pairs on the outer edges of the inner side 11. That is, the mounting pieces 20 are disposed in pairs on opposite edges of the inner side 11 so that the protection film 30 is stressed more uniformly after being attached to the mounting pieces 20.

Still referring to FIG. 3, in some embodiments, connecting holes 31 matching the mounting pieces 20 are created on the protection film 30, and the connecting holes 31 penetrate the mounting pieces 20 to connect the protection film 30 and the top cap plate 10.

The connecting holes 31 are disposed in one-to-one correspondence with the mounting pieces 20. The protection film 30 is threaded through the connecting holes 31 and attached to the mounting piece 20 to implement connection between the protection film 30 and the top cap plate 10. The connecting holes 31 make the connection between the protection film 30 and the top cap plate 10 simpler and faster, and simplify the connection structure.

Further, one end, attached to the mounting piece 20, of the protection film 30, is folded inward to form a folded edge 32. The connecting hole 31 is created on the folded edge 32.

The mounting piece 20 is accommodated in the receptacle 13. The end, connected to the mounting piece 20, of the protection film 30 is folded inward to form the folded edge 32. The folded edge 32 is attached to the mounting piece 20 through the connecting hole 31 created on the folded edge. The folded edge 32 is accommodated in the receptacle 13 together with the mounting piece 20. Therefore, on the other hand, the folded edge 32 makes the connection between the protection film 30 and the top cap plate 10 smoother. On the other hand, the folded edge 32 is accommodated in the receptacle 13, so as to be able to be protected by the inner side 11 and the outer side 12 of the top cap plate 10, thereby ensuring the stability of connection between the folded edge 32 and the mounting piece 20.

Still referring to FIG. 2, in some embodiments, the top cap plate 10 includes a boss 14. The boss 14 is supported between the inner side 11 and the outer side 12 along the thickness direction of the top cap plate 10 to space out the inner side 11 and the outer side 12 to form the receptacle 13.

To connect and support the inner side 11 and the outer side 12, a boss 14 is disposed between the inner side and the outer side. In this way, the boss 14 spaces out the inner side 11 and the outer side 12 to form a receptacle 13 at the spacer position in between.

Specifically, the boss 14 just needs to implement spacing between the inner side 11 and the outer side 12. Therefore, the boss 14 may be a plurality of cylindrical bosses 14 supported uniformly between the inner side 11 and the outer side 12. Alternatively, the bosses 14 are continuous bosses 14 supported between the inner side 11 and the outer side 12, details of which are omitted here.

Figure 6:
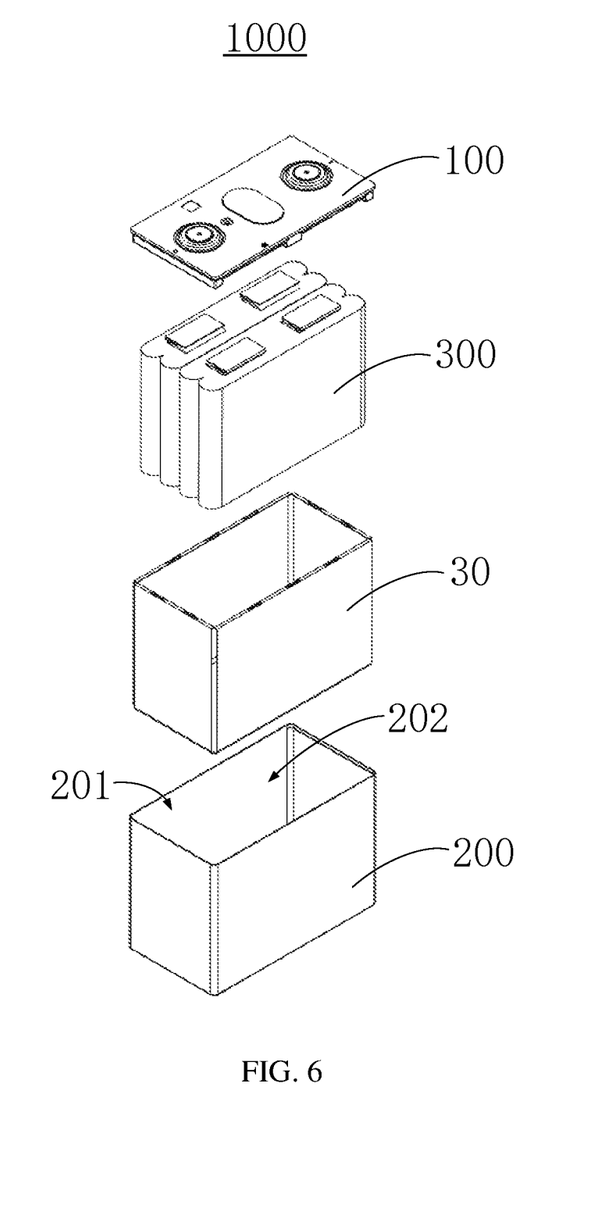
FIG. 6 is a schematic structural diagram of a battery according to an embodiment of this application.

In addition, it is hereby noted that the protection film 30 used herein may be a polyester thin film. When the battery cell 300 wrapped in the protection film 30 is put into the housing 200 of the battery 1000, the protection film 30 can not only play the role of protecting the battery cell 300, but also play an insulating role. The housing 200 of the battery 1000 is generally made of a metal material such as aluminum. Therefore, when the battery cell 300 is accommodated inside the metal housing 200, the protection film 30 wrapped around the battery cell 300 can play an insulating role to avoid a short circuit of the battery cell 300.

Understandably, the protection film 30 may be made of another insulation material other than the polyester thin film, details of which are omitted here.

Referring to FIG. 6, FIG. 6 is a schematic structural diagram of a battery 1000 according to an embodiment of this application. Based on the same conception as the top cap assembly 100, this application further provides a battery 1000 including a housing 200 with an opening 201 at one end, a battery cell 300, and the top cap assembly 100 described above. An accommodation cavity 202 communicating with the opening 201 is formed inside the housing 200. The battery cell 300 is accommodated in the accommodation cavity 202. The top cap assembly 100 is hermetically connected to the housing at the opening 201.

Based on the same conception as the battery 1000, this application further provides an electrical device including an electrical main body and the battery 1000.

In a specific implementation of this application, the battery cell 300 is welded to the top cap assembly 100 first. The protection film 30 is wrapped around the battery cell 300, and the protection film 30 is attached to the mounting piece 20 through the connecting hole 31. The mounting piece 20 is located in the receptacle 13. Therefore, an end, connected to the mounting piece 20, of the protection film 30 can be hidden in the receptacle 13, thereby protecting the junction between the protection film 30 and the mounting piece 20, improving the stability of connection between the protection film 30 and the top cap plate 10.

Further, after the protection film 30 is stably connected to the top cap plate 10, the battery cell 300 is put into the accommodation cavity 202 of the housing 200. At the same time, the top cap plate 10 can move along with the battery cell 300 and fit the opening 201 of the housing 200, thereby completing the assembling of the battery 1000.

The top cap assembly 100, the battery 1000, and the electrical device in the above embodiments exhibit at least the following advantages:

1) The inner side 11 and the outer side 12 of the top cap plate 10 are spaced apart to form the receptacle 13, so that the mounting piece 20 is accommodated in the receptacle 13. In this way, the protection film 30 can be connected to the mounting piece 20 in the receptacle 13, and the protection film 30 can be protected by the inner side 11 and the outer side 12, thereby preventing the protection film 30 from being damaged by an impact caused by an external structure to the junction between the protection film and the mounting piece 20, and in turn, ensuring that the protection film 30 can effectively protect the battery cell 300;

2) The stop portion 23 can constrain the protection film 30 attached to the mounting piece 20, and prevent the protection film 30 from being detached from the mounting piece 20, thereby improving the stability of connection between the protection film 30 and the mounting piece 20;

3) The stop portion 23 and the free end 22 fit together to form a snap hook structure, thereby making it convenient to attach the protection film 30 to the snap hook structure, and implementing quick connection between the protection film 30 and the mounting piece 20; and 4) The mounting pieces 20 are arranged on the outer edge of the inner side 11 along the circumferential direction, thereby making it convenient for the protection film 30 to be passed through the threading clearance between the mounting piece 20 and the outer side 12 and attached to the mounting piece 20, and improving the efficiency of connection between the protection film 30 and the mounting piece 20.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some or all technical features in the technical solutions. Such modifications and equivalent replacements fall within the scope of the claims and specification hereof without making the essence of the corresponding technical solutions depart from the scope of the technical solutions of the embodiments of this application. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A top cap assembly, comprising:
   a top cap plate, comprising an inner side and an outer side disposed opposite to each other along a thickness direction of the top cap plate and spaced apart from each other, the inner side has a first wall facing the outer side, the outer side has a second wall facing the inner side, a receptacle is formed between the first wall and the second wall, and the receptacle communicates with an outside space;
   a mounting piece, disposed protrusively in the receptacle and comprising a fixed end and a free end disposed opposite to each other, wherein the fixed end is disposed on one of the first wall and the second wall, and the free end extends along the thickness direction of the top cap plate toward another one of the first wall and the second wall and is spaced apart from the other one of the first wall and the second wall to form a threading clearance between the free end and the other one of the first wall and the second wall; and
   a protection film, wherein one end of the protection film extends into the receptacle through the threading clearance to be attached to the mounting piece.

2. The top cap assembly according to claim 1, wherein the receptacle comprises a top wall and a bottom wall disposed opposite to each other along the thickness direction of the top cap plate, the fixed end of the mounting piece is disposed on one of the top wall or the bottom wall of the receptacle, and the free end is spaced apart from the other of the top wall or the bottom wall to form the threading clearance.

3. The top cap assembly according to claim 1, wherein the mounting piece further comprises a stop portion, and the stop portion is disposed protrusively on a surface of the free end, the surface being oriented back from an opening of the receptacle.

4. The top cap assembly according to claim 3, wherein the stop portion and the free end are fitted together to form a snap hook structure oriented back from an opening surface of the receptacle.

5. The top cap assembly according to claim 1, wherein the mounting piece is one of at least two mounting pieces of the top cap assembly, and all the mounting pieces are arranged at intervals on an outer edge of the inner side along a circumferential direction.

6. The top cap assembly according to claim 1, wherein a connecting hole matching the mounting piece is created on the protection film, and the connecting hole penetrates the mounting piece to connect the protection film and the top cap plate.

7. The top cap assembly according to claim 6, wherein one end, attached to the mounting piece, of the protection film, is folded inward to form a folded edge, and the connecting hole is created on the folded edge.

8. The top cap assembly according to claim 1, wherein the top cap plate comprises a boss, and the boss is supported between the inner side and the outer side along the thickness direction of the top cap plate to space out the inner side and the outer side to form the receptacle.

9. A battery, comprising:
a housing with an opening formed at one end, wherein an accommodation cavity communicating with the opening is formed inside the housing;
a battery cell, accommodated in the accommodation cavity; and
the top cap assembly according to claim 1, wherein the top cap assembly is hermetically connected to the housing at the opening.

10. An electrical device, comprising an electrical main body and the battery according to claim 9.

* * * * *